S. S. Dice,
Drag Saw.
N° 31,877. Patented Apr. 2, 1861.
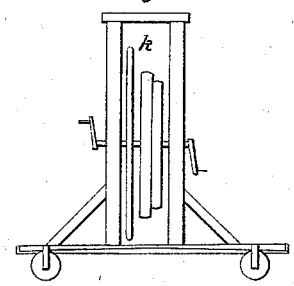
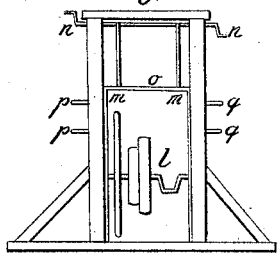
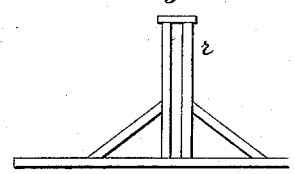
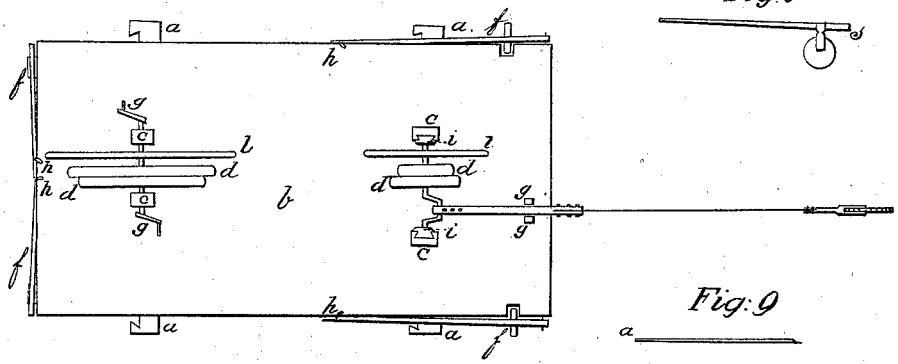
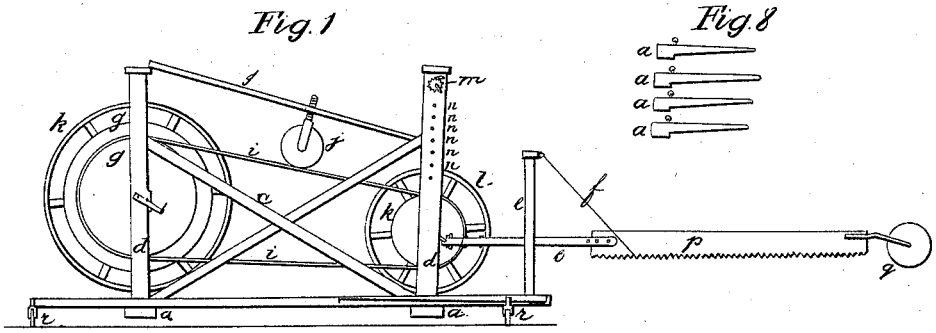
Witnesses  Inventor
Samuel S Dice

UNITED STATES PATENT OFFICE.

SAMUEL S. DICE, OF PARIS, OHIO.

CROSSCUT-SAWING MACHINE.

Specification of Letters Patent No. 31,877, dated April 2, 1861.

*To all whom it may concern:*

Be it known that I, SAMUEL S. DICE, of Paris, in the county of Stark and State of Ohio, have invented a new and useful Sawing-Machine or for Cross-Cutting Timber, Called the "Forest Sawing - Machine" or "Cross-Cutting Timber;" and I do hereby declare that the following is a full and exact description thereof, reference being had to the accompanying drawings and to the letters of reference marked thereon.

Section 1, on the left is a side view when standing ready for motion. Section 2, on the left the platform of the machine. Section 3, end view of the hind part of the machine. Section 4, front end view of shafting and slides. Section 5, pitman guard to slide in. Section 6, back end lever and roller. Section 7, side lever and roller. Section 8, four keys with rings. Section 9, a crow-bar to raise keys when about moving the machine.

To enable others to make use of my invention I will proceed further to describe its construction and operation.

Section 1. $a$, $a$, end of bottom sills—$c$, $c$, braces—$d$, $d$, the upright frames—$e$, guard for pitman—$f$, a hook to raise saw when cut through the log—$g$, $g$, master of pulleys—$h$, balance wheel—$i$, $i$, the belt—$j$, $j$, belt tightener—$k$, front pulleys—$l$, balance wheel in front—$m$, a windlass to lower or raise the front gearing when required in sawing heavy or light timber—$n$, $n$, $n$, $n$, $n$, $n$, $n$, bolts to fasten the front gearing on slides when raised up or let down—$o$, the pitman—$p$, the saw—$q$, roller to keep the saw from striking the ground when cut through the log—$r$, $r$, rollers to move the machine sidewise along the timber.

Section 2. $b$, plank bolted to the sills—$a$, $a$, $a$, $a$, sills of platform—$c$, $c$, $c$, $c$, top of shaft posts—$d$, $d$, $d$, $d$, front and rear pulleys—$e$, $e$, balance wheels—$f$, $f$, $f$, $f$, levers and rollers to move machine sidewise as is needed—cut for cut—levers fastened by a bolt at the end; and roller or shaft of roller are fixed ten inches back from bolt or end of lever—so when lever is raised the sills of platform are on the ground and rollers are raised so it can be keyed fast to the ground, while sawing; and when levers are pressed down with catches at edges of plank or platform $h$, $h$, $h$, $h$, then the machine is on rollers to move sidewise—$i$, $i$, showing the groove of slide—$j$, $j$, top of guard posts.

Section 3. $k$ a view of rear gearing, of pulleys and turning crank and rollers together.

Section 4. $l$ front pulleys—balance wheel shaft and crank of pitman—$m$, $m$, slides—$n$, $n$, straps attached to letter $o$, to let up or down the front gearing by windlass $p$, $p$, bolted by $q$, $q$.

Section 5. $r$ pitman guard.

Section 6. $s$ end lever and roller.

Section 7. $t$ side roller and lever.

Section 8. $a$, $a$, $a$, $a$, keys to fasten down the machine.

Boxing to be of brass or other material answering the purpose.

The machine to be worked by hand—by one or two persons. Ordinary size of the machine is two and a half by five feet exclusive of the saw—and can be applied to timber in any shape or of any size. The machine can be moved by a hand cart to any place where it is wanted. The machine is easy of construction and the cost of construction with good materials will not exceed twenty five dollars. It is intended to be especially practicable in the forest where other means of sawing are inconvenient.

I disclaim the saw and pitman as my invention but

Claim—

The pulley at end of saw in combination with the saw in cross cut sawing machines.

SAMUEL S. DICE.

Witnesses:
JOHN LAHM,
ISAAC HAZLETT.